O. H. ORDWAY.
MACHINE FOR TWISTING WOOD.
No. 595,199.  Patented Dec. 7, 1897.
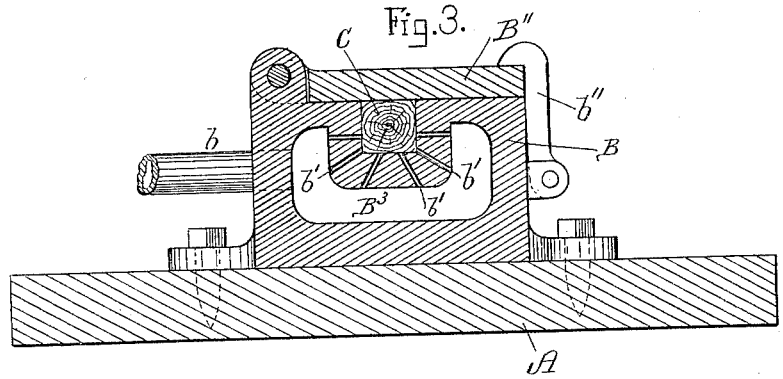
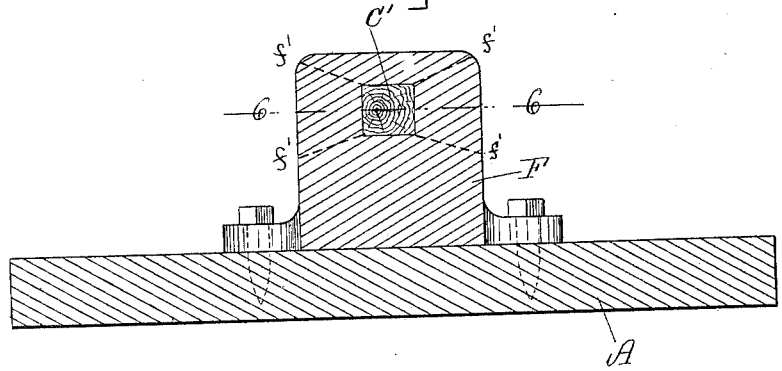

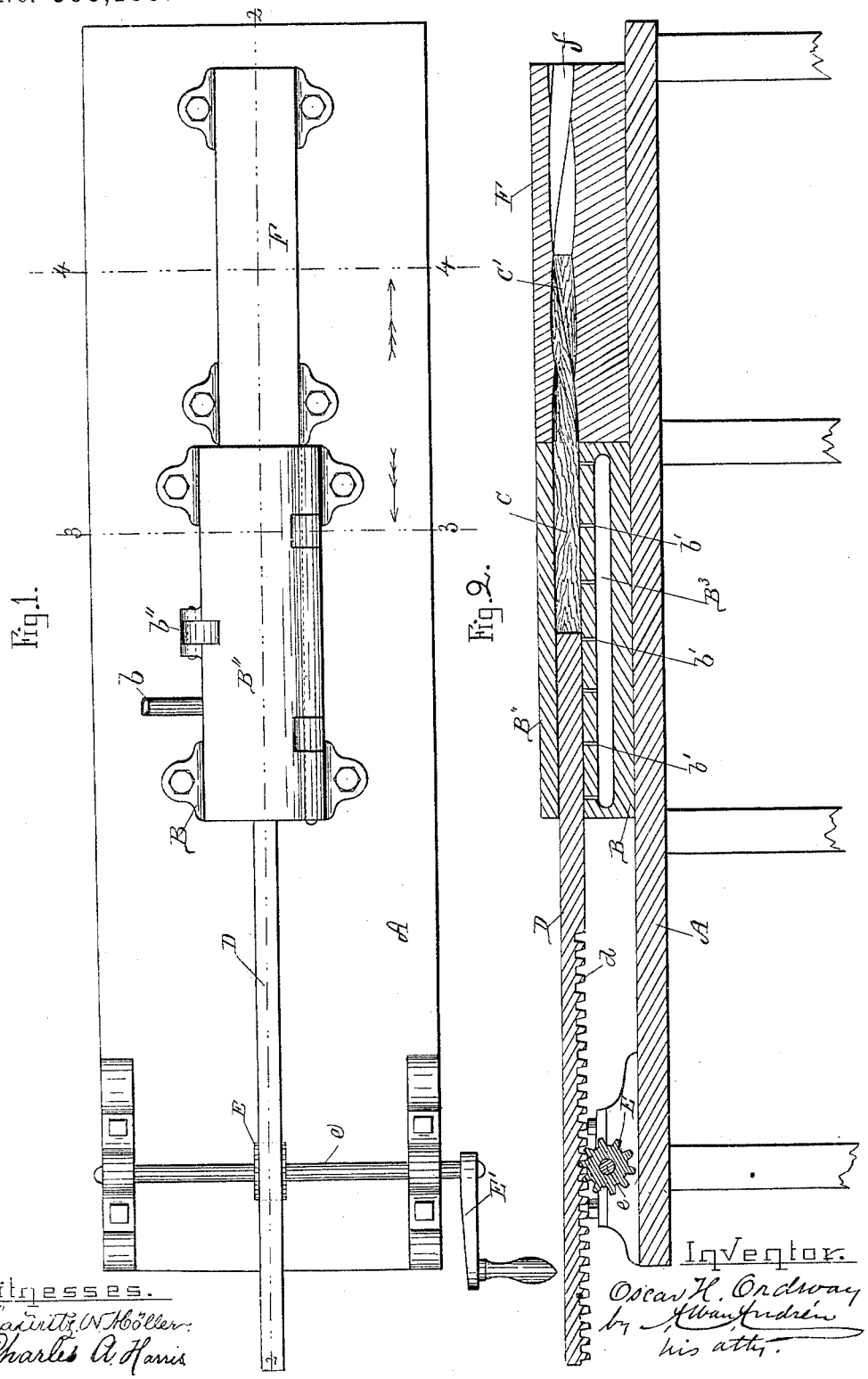

(No Model.) 3 Sheets—Sheet 3.

O. H. ORDWAY.
MACHINE FOR TWISTING WOOD.

No. 595,199. Patented Dec. 7, 1897.

Witnesses.
Lauritz N. Möller.
Charles A. Harris.

Inventor.
Oscar H. Ordway
by Alban Andrén
his att'y.

UNITED STATES PATENT OFFICE.

OSCAR H. ORDWAY, OF SOUTH FRAMINGHAM, MASSACHUSETTS, ASSIGNOR TO ALBERT H. ORDWAY, OF SAME PLACE.

MACHINE FOR TWISTING WOOD.

SPECIFICATION forming part of Letters Patent No. 595,199, dated December 7, 1897.

Application filed March 29, 1897. Serial No. 629,673. (No model.)

*To all whom it may concern:*

Be it known that I, OSCAR H. ORDWAY, a citizen of the United States, and a resident of South Framingham, in the county of Middlesex and State of Massachusetts, have invented new and useful Improvements in Shaping Wood, of which the following, taken in connection with the accompanying drawings, is a specification.

This invention relates to improvements in machines for imparting a torsional twist to green or moist wooden bars or rods having an angular shape in cross-section, and has for its objects to provide means for this purpose comprising a twister-die, into which the bars or rods are forced and allowed to remain until they permanently retain their twisted form, said die having a longitudinal bore of angular shape in cross-section, the walls of which are twisted torsionally along their length, and in means for guiding and forcing the said bars or rods to be shaped into the twister-die, said guiding means being arranged to hold one end of the said bar or rod against rotation while being forced into the said twister-die.

Figure 5:
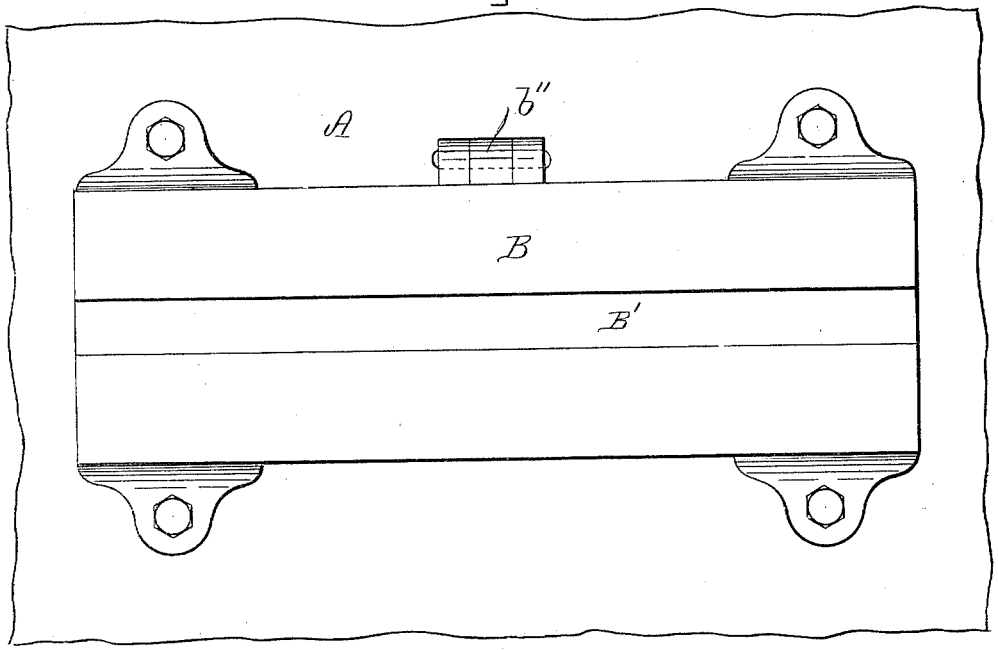
Figure 6:
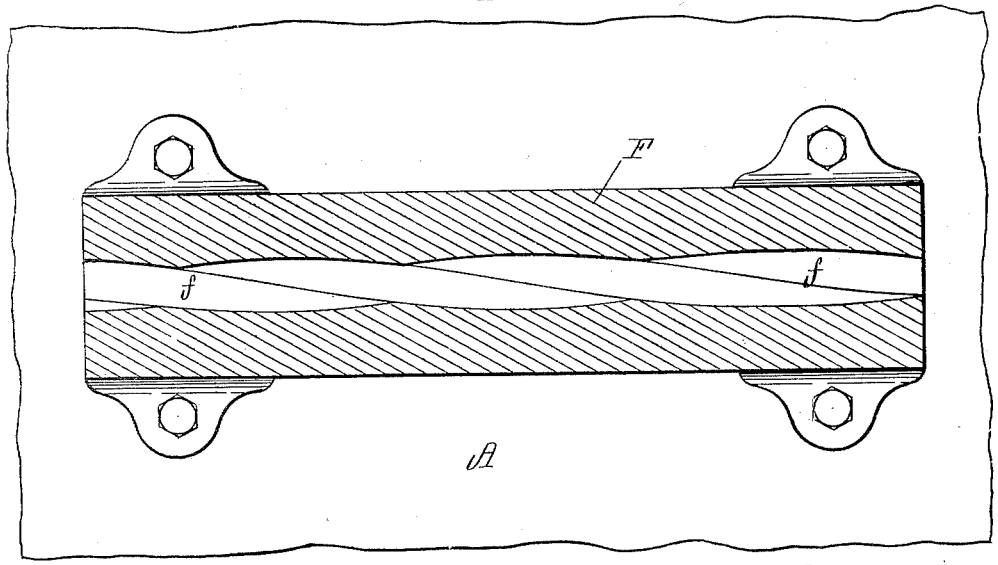

Figure 1 represents a top plan view of my improved wood-twisting machine. Fig. 2 represents a central longitudinal section on the line 2 2 shown in Fig. 1. Fig. 3 represents an enlarged cross-section on the line 3 3 shown in Fig. 1. Fig. 4 represents an enlarged cross-section on the line 4 4 shown in Fig. 1. Fig. 5 represents an enlarged top plan view of the guide-block, showing its top or cover removed. Fig. 6 represents a horizontal section of the twisting-die, shown as being taken on the line 6 6 in Fig. 4. Fig. 7 represents a perspective view of a wooden rod before being twisted by my improved machine and method, and Fig. 8 represents a side elevation of said rod after being twisted.

Similar letters refer to similar parts wherever they occur on the different parts of the drawings.

In the drawings, A represents a suitable table, bench, or support, on which is secured the driver or plunger guide-block B, which receives the wood C to be twisted, as well as the reciprocating driver or plunger D, as shown in Figs. 1 and 2. The driver or plunger D may be reciprocated by any suitable means, and I have in the drawings, Figs. 1 and 2, shown for this purpose said driver or plunger as provided with a rack $d$, the teeth of which mesh in the teeth of a pinion E, secured to a shaft $e$, journaled in bearings attached to the table A and provided with a crank E', by means of which the said pinion E may be rotated to the right and left during the operation of the machine. I wish, however, to state that I do not desire to confine myself to any particular means or mechanism for reciprocating said driver or plunger, as this may be done in any well-known manner without departing from the essence of my invention.

The guide-block B is provided with a longitudinal perforation B', which in cross-section corresponds with the cross-section of the wooden rod C that is to be twisted. Thus if the latter is square or polygonal in section the longitudinal guide-perforation B' is of a correspondingly-shaped section, so as to cause the wooden rod or blank to fit closely within such guide-sleeve during the process of twisting it.

The section of the driver or plunger D is likewise made corresponding to that of the wooden rod C to be twisted and to the shape of the said guide-sleeve B'.

In practice I prefer to provide the guide-block B with a preferable hinged cover B'', which may be swung open or removed altogether from the block B previous to placing within its guide groove or perforation B' the wooden rod or bar that is to be twisted, and after such bar has been inserted therein the cover B'' is closed and fastened down by means of a hook $b''$ or any other well-known locking or fastening device.

In practice I prefer to make within the guide-block B a steam-jacket $B^3$, which may be supplied with steam under pressure from a pipe $b$, leading from a boiler or other source of steam-pressure.

$b'$ $b'$ are steam ports or passages leading from the jacket or steam-chamber $B^3$ to the guide groove or perforation B', in which the wooden bar C is being guided during the twisting operation, and by such arrangement the wooden blank or bar is steamed and rendered more plastic and yielding during the twisting operation.

In alinement with the longitudinal perforation B' of the guide-block B is arranged the twister-die F, which is detachably secured in a suitable manner to the support or table A, as shown. Said twister-die is provided with a longitudinal twisted bore or perforation *f*, into which the green or steamed rod C is pushed by the driver or plunger D as it is being forced from the guide groove or perforation B' in the guide-block B, and it will thus be seen that the said wooden rod, bar, or blank is caused to be torsionally twisted to correspond with the internal torsional form of the twisted perforation *f* in the twister-die F.

C' in Fig. 8 represents the wooden bar after being twisted in the manner above described. After said bar has been twisted in the manner above mentioned it is allowed to remain within the said twister-die until it is thoroughly dry, when it is removed from within said die. During such drying process I prefer to remove the said twister-die and the twisted rod remaining within it from the table A and replace it by another similar die for twisting another rod, and so on.

To remove the twisted rod from within the twister-die F after said rod is dried and hardened, it is only necessary to push it out lengthwise therefrom either by means of the plunger D and a wooden rod placed in the guide-block B, by which the finished rod is being forced out of the die F during the twisting operation of the next rod, and so on; or, if so desired, the die F may be made in parts and divided longitudinally, as represented by dotted lines *f' f'* in Fig. 4, so as to enable such parts to be detached whenever it is desired to remove the twisted and dried wooden bar from within said twister-die.

In shaping the wooden bars or rods I proceed as follows: I take a wooden bar of any desired section, either green or steamed, and place it in the longitudinal groove B' of the guide-block B and close the cover on said guide-block, after which the said wooden rod is forced onward through said guide-block by means of the plunger D, causing the wooden bar to be forced into the torsionally-twisted perforation *f* in the twister-die F, by which the rod is made to assume the torsional form, as shown in Fig. 8, corresponding to the said torsional perforation *f* in the twister-die.

In the drawings I have shown said twister-die as being straight for making straight rods; but said twister-die may be made segmental or curved in any suitable manner if it is desired to produce twisted as well as curved rods.

I wish to say that although a guide-block is shown in the drawings and a reciprocating plunger or driver actuated by a rack and pinion such devices are not absolutely necessary, as the wooden rod may be forced through the twister-die in any other suitable manner without departing from the spirit of my invention.

Having thus fully described the nature, construction, and operation of my invention, I wish to secure by Letters Patent and claim—

1. A machine for imparting a torsional twist to wooden bars or rods having an angular shape in cross-section, consisting of a twister-die having a longitudinal bore of angular shape in cross-section, the walls of which are twisted torsionally along their length, and means for guiding and forcing the bars or rods to be shaped into said twister-die, said guiding means being arranged to hold one end of the said rod or bar against rotation while being forced into the said twister-die.

2. A machine for imparting a torsional twist to wooden bars or rods having a polygonal shape in cross-section, said machine consisting of a twister-die having a longitudinal bore of uniform diameter throughout its length and of polygonal shape in cross-section, the inner walls of said bore being twisted torsionally along their length, and means for guiding and forcing the rods or bars to be shaped into said twister-die, said guiding means being arranged to hold one end of the bar or rod against rotation while being forced into the twister-die.

3. A machine for imparting a torsional twist to wooden bars or rods having an angular shape in cross-section, consisting of a longitudinally-grooved guide-block, said groove being of angular shape in cross-section and having a hinged cover by which access may be had to said groove, said guide-block being adapted to hold the rods or bars against rotation, a twister-die having a longitudinal bore of angular shape in cross-section, the inner walls of said bore being twisted torsionally along their length, and a driver or plunger for forcing the bars or rods to be shaped through the said guide-block and into the twister-die.

4. The herein-described machine for shaping wooden rods or bars, consisting of a twister-die having a longitudinally-twisted bore through which the green or steamed wooden bar is forced and in which it is allowed to remain until it retains its twisted form and means for holding one end of the bar or rod against rotation while it is being forced into the twister-die, substantially as and for the purpose set forth.

5. The herein-described machine for shaping wooden rods or bars, consisting in combination a longitudinally grooved or perforated guide-block, said groove being angular in cross-section, and adapted to hold one end of the bar or rod against rotation, a twister-die having a longitudinal twisted bore or perforation in alinement with the guide-groove in the guide-block, and a reciprocating driver or plunger for forcing the green or steamed bar through the guide-block and twisted bore or perforation in the twister-die, substantially as and for the purpose set forth.

6. The herein-described machine for shaping wooden rods or bars consisting in combination a guide-block having a longitudinal perforation for receiving the green or steamed wooden bar, a steam-jacket in said guide-block for forcing steam in contact with the wooden bar or rod, a twister-die having a twisted bore or perforation in alinement with the groove in the guide-block and a reciprocating driver or plunger for forcing the wooden bar through the guide-groove and through the twisted bore or perforation in the twister-die, substantially as and for the purpose set forth.

In testimony whereof I have signed my name to this specification, in the presence of two subscribing witnesses, on this 26th day of March, A. D. 1897.

OSCAR H. ORDWAY.

Witnesses:
ALBAN ANDRÉN,
LAURITZ N. MÖLLER.